(12) United States Patent
Lugtenburg

(10) Patent No.: US 7,840,374 B2
(45) Date of Patent: Nov. 23, 2010

(54) METHOD AND DEVICE FOR MEASURING AN OBJECT FOR MEASUREMENT

(76) Inventor: Jan Bernd Lugtenburg, Kälblesrainweg 83/1, 73430 Aalen (DE)

( * ) Notice: Subject to any disclaimer, the term of this patent is extended or adjusted under 35 U.S.C. 154(b) by 479 days.

(21) Appl. No.: 10/599,284

(22) PCT Filed: Mar. 19, 2005

(86) PCT No.: PCT/EP2005/002960

§ 371 (c)(1),
(2), (4) Date: Sep. 25, 2006

(87) PCT Pub. No.: WO2005/098354

PCT Pub. Date: Oct. 20, 2005

(65) Prior Publication Data

US 2008/0228441 A1   Sep. 18, 2008

(30) Foreign Application Priority Data

Apr. 2, 2004 (DE) ........................ 10 2004 017 172

(51) Int. Cl.
G01B 5/20 (2006.01)

(52) U.S. Cl. ........................ 702/167; 702/166; 356/497; 356/602

(58) Field of Classification Search ......... 702/166–167; 356/497, 602
See application file for complete search history.

(56) References Cited

U.S. PATENT DOCUMENTS

| | | | |
|---|---|---|---|
| 4,721,388 A | * | 1/1988 | Takagi et al. ................. 356/602 |
| 4,908,951 A | | 3/1990 | Gurny |
| 5,570,185 A | | 10/1996 | Jokinen et al. |
| 5,793,492 A | * | 8/1998 | Vanaki ........................ 356/613 |
| 6,954,557 B2 | * | 10/2005 | Kim et al. .................... 382/286 |
| 2003/0038948 A1 | * | 2/2003 | Prinzhausen et al. ......... 356/497 |
| 2003/0112448 A1 | | 6/2003 | Maidhof et al. |
| 2006/0158663 A1 | * | 7/2006 | Martinschledde et al. ... 356/602 |

FOREIGN PATENT DOCUMENTS

| | | | |
|---|---|---|---|
| DE | 38 36 540 A1 | | 5/1990 |
| DE | 3836540 | * | 5/1990 |
| DE | 198 52 149 A1 | | 5/2000 |
| JP | 57-137135 | | 8/1982 |
| JP | 6-39683 | | 2/1994 |
| JP | 10-147417 | | 6/1998 |
| WO | WO 01/07866 A1 | | 2/2001 |

* cited by examiner

Primary Examiner—Sujoy K Kundu
(74) Attorney, Agent, or Firm—Akerman Senterfitt

(57) ABSTRACT

The invention relates to a method and device for measuring an object for measurement, comprising at least one reference structure for the definition of an object coordinate system, fixed with relation to the object, by means of a measuring system, which comprises at least one sensor system for recording a contour of the object for measuring in a measurement coordinate system. According to the invention, the object for measurement is placed in a measuring position in the recording region of the sensor system, the position of the object coordinate system is fixed by means of the reference structure, the object coordinate system is linked to the measurement coordinate system, the sensor system is turned about a rotation axis relative to the object for measurement, in order to determine contour data and a processing of the contour data carried out in an analytical unit, taking into account the position of the object coordinate system. The invention further relates to an application for contour determination.

27 Claims, 5 Drawing Sheets

METHOD AND DEVICE FOR MEASURING AN OBJECT FOR MEASUREMENT

Figure 1:
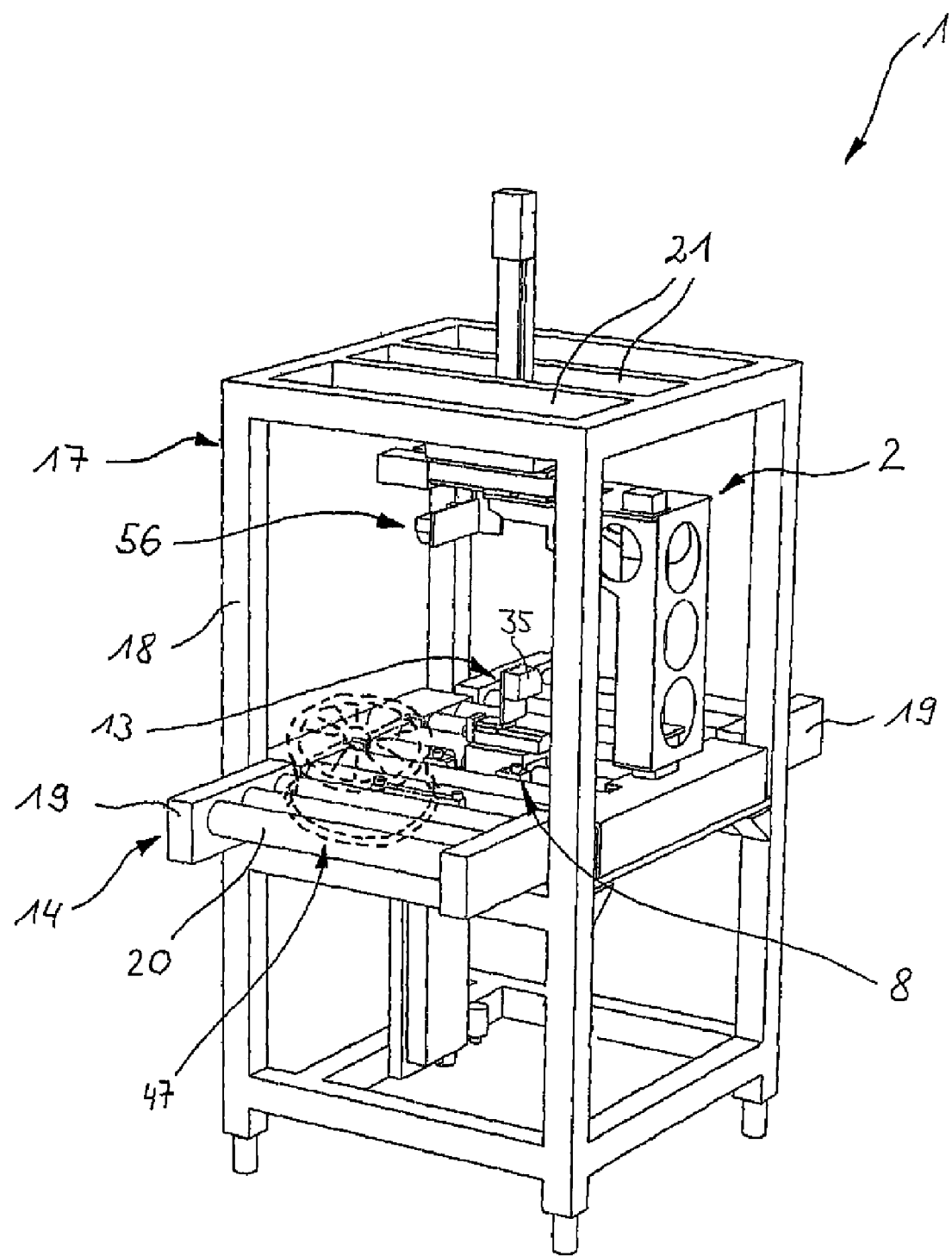

The invention relates to a method and to a device for measuring an object to be measured or measurement object, which has at least one reference structure for the definition of an object-fixed object coordinate system with the aid of a measuring system comprising at least one sensor system for recording a contour of the measurement object in a measurement coordinate system.

Such measuring systems are e.g. used for quality assurance purposes in the production of motor vehicle wheels. In connection with motor vehicle wheels high demands are made on the precision of the measuring method and measurement period within which the wheels are measured. The ever increasing quality demands with respect to vehicle wheels are inter alia based on the fact that influences on the dynamic behaviour of a vehicle chassis are increasingly determined by the characteristics of rotary elements such as e.g. a hub with an integrated brake disk or brake drum and/or the vehicle wheel and the tyre drawn onto the same. The significance of these influences is intensified by the use of light construction chassis made from light alloy and/or high strength steel alloys, because there is a continuous decrease in the weight proportion of the chassis in the unsprung weights, whereas there is an increase in the influences attributable to contour or weight variations of the rotating vehicle wheel and tyre.

In the case of lorries or trucks, in which for increasing the useful load considerable effort and expenditure has been made for reducing the vehicle wheel weight, ever lighter and therefore with respect to the shape stability ever more sensitive vehicle wheels are used. In addition, in view of rising speeds, in the case of trucks dynamic influences of the vehicle wheels increasingly affect the travel behaviour, which is consequently essentially determined by the accuracy of shape of the vehicle wheels. This more particularly applies with light transporters, which travel at speeds well over 160 km/h and consequently similar problems arise to those in cars.

In cars, which can be operated at even higher speeds and which are increasingly equipped with electronically controlled chassis, the demands made on the dynamic characteristics of the car wheel and the associated tyre also rise. Relevant shape variations with respect to the sought rotation similarity must be detected during car wheel production and if necessary eliminated. This has led in the past to significant reductions in tolerances on the car wheels. Typical concentricity and shape tolerances for a tyre seating on a car wheel are at present around 0.3 mm, position tolerances for a mounting hole are about 0.15 mm, whilst a hub bore or hole usable as a reference structure is tolerated with ranges between 0.02 and 0.05 mm. The maintaining of these tolerances in series production processes, particularly in the manufacture of cast light alloy wheels is at the limit of achievability with the presently used manufacturing equipment and the mechanical machining times to be respected for profitable manufacture (turning, drilling in light alloy wheels, rolling, deep drawing, pressing, welding, calibrating for steel wheels). This makes it necessary to inspect all or many wheels, because the process windows for individual method steps are small and spot checks do not lead to an adequate statistical reliability for a high quality production process.

A known measuring system for vehicle wheels is described in DE 38 36 540 C2, which describes a multipoint measuring device for measuring vehicle wheels, their rims and/or wheel dishes. The multipoint measuring device has a plurality of transducers, which are arranged around a central clamping unit. The central clamping unit is used for centering and measuring the central hole of the vehicle wheel and for initiating a rotation of the latter about a rotation axis in order to move the rim circumference passed the transducers for measurement purposes. The transducers are designed as positioning slide systems with computer-controlled positioning drives movable past the rotation axis of the clamping unit and sense the tyre seatings, bolt holes and other relevant features and therefore the contour of the vehicle wheel to be measured during the rotation thereof in a mechanical manner using gauge rolls. Thus, all relevant contours can be sensed or scanned by the central clamping unit by a rotation of the vehicle wheel. With respect to the multiplicity of shapes and sizes of vehicle wheels which are normally tested with such a measuring device, important precautions are necessary for the design of the central clamping unit and transducers and these affect the costs, precision and reliability of such a multipoint measuring device.

A fundamental problem of the invention is to provide a method and a device of the aforementioned type permitting in a simpler, more cost effective manner the measurement of measurement objects, particularly vehicle wheels. Another problem is to provide a measuring method and a measuring device suitable for the performance thereof permitting the rapid, high precision measurement of rotation-like or substantially rotation symmetrical measurement objects, such as e.g. vehicle wheels, independently of their dimensions. A particular aim is a near-production dimensional measurement of many or all functionally relevant dimensions at a speed adaptable to the manufacturing process. A further aim is a rapid resetting to different measurement object dimensions.

These problems are solved by a method according to claim 1 and a device suitable for performing the method according to claim 11. Advantageous further developments are given in the dependent claims. By reference the wording of all the claims is made into part of the content of the present description.

For performing the method, particularly using the device, the measurement object is positioned in a measurement position, which is in the coverage of the sensor system in order to permit an optionally complete recording of the measurement object contour. The measurement of the measurement object takes place in the measurement coordinate system. The establishment of the position of the object coordinate system of the measurement object by means of the reference structure is used for creating a reference between the measurement object contour to be determined and the object coordinate system of the measurement object. For contour determination purposes, contour data are determined by rotating the sensor system about a rotation axis relative to the measurement object and it is then possible to process the same in an evaluation unit whilst taking account of the object coordinate system position. The contour data can be transferred during and/or after measurement by means of a transformation from the measurement coordinate system into the object coordinate system, so that a quality evaluation can be carried out, particularly by comparison of the determined contour data with reference data filed in the evaluation unit.

In the case of the prior art measuring systems for vehicle wheels or other substantially rotationally symmetrical measurement objects, a rotation of the measurement object takes place with the sensor system stationary, which requires an acceleration and deceleration of the measurement object, which can have significant weight and dimension differences. Through the rotation of the sensor system in the inventive measuring device there is no need to move the measurement object in order to perform the measuring process. The weight and dimension of the measurement object do not influence the dynamics of the measuring process, because with the rotation of the sensor system a system with constant dynamic characteristics is moved. In a further development the measurement object rests during measurement, whereas the sensor system rotates about an axis enclosed by the measurement object circumference. There is also no problem of mechanically centering the measurement object by means of a generally very sensitive reference structure. As a result of the reference device provided for establishing the object coordinate system position, there is no need for an exact positioning of the measurement object relative to the measurement coordinate system, because the position and orientation of the object coordinate system are determined with the aid of the reference structure and can be related to the contour data determined by the measurement system in the measurement coordinate system. This makes it possible to virtually eliminate sources of error, such as dirt particles between the measurement object and a clamping device provided for centering purposes. For different measurement objects the reference structure can be differently dimensioned and/or designed, so that a determination of the reference structure requires a high flexibility of the equipment provided for this purpose. Resetting to other measurement object dimensions can be performed without adapting mechanical components, e.g. by modifying position parameters in a control.

According to a development of the invention, during the measurement, the measurement object is fixed by a centering device so that access to the reference structure is not impeded. The centering device permits an adequately precise and reliable positioning of the measurement object in the coverage range of the sensor system. The coverage range can also be called the "capture range". Its spatial extension can differ as a function of the sensor system type used. The coverage range defines the spatial range within which a sensor system can adequately precisely record contour data of the measurement object. Fixing permits a reliable measurement of the measurement object contour, because external influences such as vibrations or other mechanical interference can at least partly be eliminated. Through fixing during measurement it is possible to prevent the measurement object being moved by external influences within the coverage range of the sensor system or even out of the same, so as to bring about a faulty measurement. Due to reference structure accessibility a low-error coverage or recording of the reference structure is ensured, because there can be a direct scanning of said reference structure, particularly in synchronous manner for recording contours.

According to a further development of the invention the measurement object is fixed in the measurement position in such a way that the reference structure is accessible for securing the position of the measurement object, which is rotation-like with respect to a measurement object axis, the reference structure is located within the outer contour of the measurement object in the vicinity of the measurement object axis and a centering device acts on the outer contour of the measurement object for centering the latter. By the application of the centering device to the outer contour of the measurement object, it is possible to ensure in simple manner that the reference structure arranged within the outer contour of the measurement object in the vicinity of its axis, is e.g. central with respect thereto, is freely accessible for the reference device and consequently determination of the object coordination system can take place relative to the measurement coordinate system. Such embodiments are e.g. suitable for the measurement of vehicle wheels, in which the central hole of the wheel or rim can be used as the reference structure.

According to a further development of the invention, a reference device scans the substantially freely accessible reference structure for securing the position of the object coordinate system. The measurement of the contour and position of the reference structure is easily possible due to the free accessibility. In an advantageous embodiment of the invention the reference structure is scanned or sensed in noncontacting manner. As a result of noncontacting scanning, which can be performed in particular optically, inductively and/or capacitively, it is virtually impossible for any influencing of the reference structure and/or a change to the measurement object position through the measurement process, which ensures a particularly precise reference structure scanning. A noncontacting scanning makes it possible to cover a large number of different reference structures and there is no risk of a mutual influencing between the reference device and sensor system, which could lead to imprecision in the measurement of the measurement object. In other embodiments there is a tactile scanning, e.g. with the aid of one or more feelers.

According to a further development of the invention, a reference device performs a mechanical orientation of the measurement object with the aid of the reference structure for securing the position of the object coordinate system. Thus, there can be a reliable orientation of the measurement object relative to the sensor system even under rough environmental conditions for measuring the measurement object by the measuring system, particularly with strong vibrations or a high level of dirtiness of the measurement environment. Thus, the measuring system can also be used in production environments in which the establishment of the position of the object coordinate system with the aid of the freely accessible reference structure is made more difficult, e.g. with extreme vibration loads or with a high dirtying risk for noncontacting reference devices.

In a preferred embodiment of the invention an in particular mechanical or noncontacting measurement of the reference structure is carried out by the reference device, so that besides the object coordinate system position it is also possible to make available information concerning the contour of the reference structure, e.g. its size, shape and/or shape variation compared with a desired or nominal shape.

According to another development of the invention, a shape and/or position variation of at least one measurement object surface portion oriented substantially orthogonally to a rotation axis of the sensor system and constructed on the measurement object is established by means of the sensor system and/or reference device compared with a desired shape or position. The measurement object surface portion can e.g. be provided for engagement on an object surface. This also permits the scanning of areas of a measurement object which are outside the substantially rotation-like contours of the measurement object, but which are still very important for a quality evaluation of the measurement object. The measurement surface portion can e.g. be a bearing surface of a vehicle wheel relative to a wheel hub.

According to a further development of the invention, through a marking device connected to the sensor system a marking is made on the measurement object. Thus, without additional method steps or devices, directly during the measurement of a measurement object or after determining the entire contour of said object, a marking can be made on said object, particularly at a characteristic measurement point. This marking, which e.g. with vehicle wheels designates a high or low point, can be used when the measurement object is employed for further process steps, particularly for correctly placing a tyre on the vehicle wheel.

According to a further development of the invention, the reference device is arranged in rotary manner and substantially coaxially to a rotation axis of the sensor system. Due to the substantially coaxial arrangement with respect to the rotation axis of the sensor system, the object coordinate system determined by the reference device can be easily used for establishing the measurement object contour. As a result of a rotary fitting of the reference device it is also possible with a simple sensor system, which e.g. only has a single sensor, to bring about an advantageous metrological resolution of the measurement object surface portions to be scanned or the reference structure along its entire circumference.

According to a further development of the invention the measurement system is integrated into a conveying device. Therefore, without any greater surface area consumption and without using complex handling equipment, such as robots or the like, the measurement system can be particularly integrated into a linear conveying system. This obviates additional handling of the measurement object for removal from the conveying device and positioning in the measurement system, which contributes to reducing the risk of damage to the measurement object. The measuring system is preferably adapted to the conveying device, so that the latter can convey the measurement object directly, i.e. without intermediate manipulations, to the measuring position and, after measurement, can convey it out of said position. A conveying section of the conveying device can in particular be guided over the measurement position, e.g. linearly in such a way that the measurement object is conveyed from one side to the measurement position and away from the latter on a facing side.

According to a further development of the invention, there are size detection means for a basic positioning of the sensor system and/or reference device. These can in particular be fitted to the conveying device independently of the measuring system. Thus, even on conveying in the measurement object, there can be a presetting of the sensor system and/or reference device, so that at the start of the actual measuring process no further extending adjustment is required. This makes it possible to reduce the measurement cycle time, which is particularly interesting in the mass production of measurement objects of different sizes.

Further advantages and features of the invention can be gathered from the following description of preferred embodiments and the attached drawings, wherein show:

FIG. 1 A perspective view of a measuring system for vehicle wheels.

Figure 2:
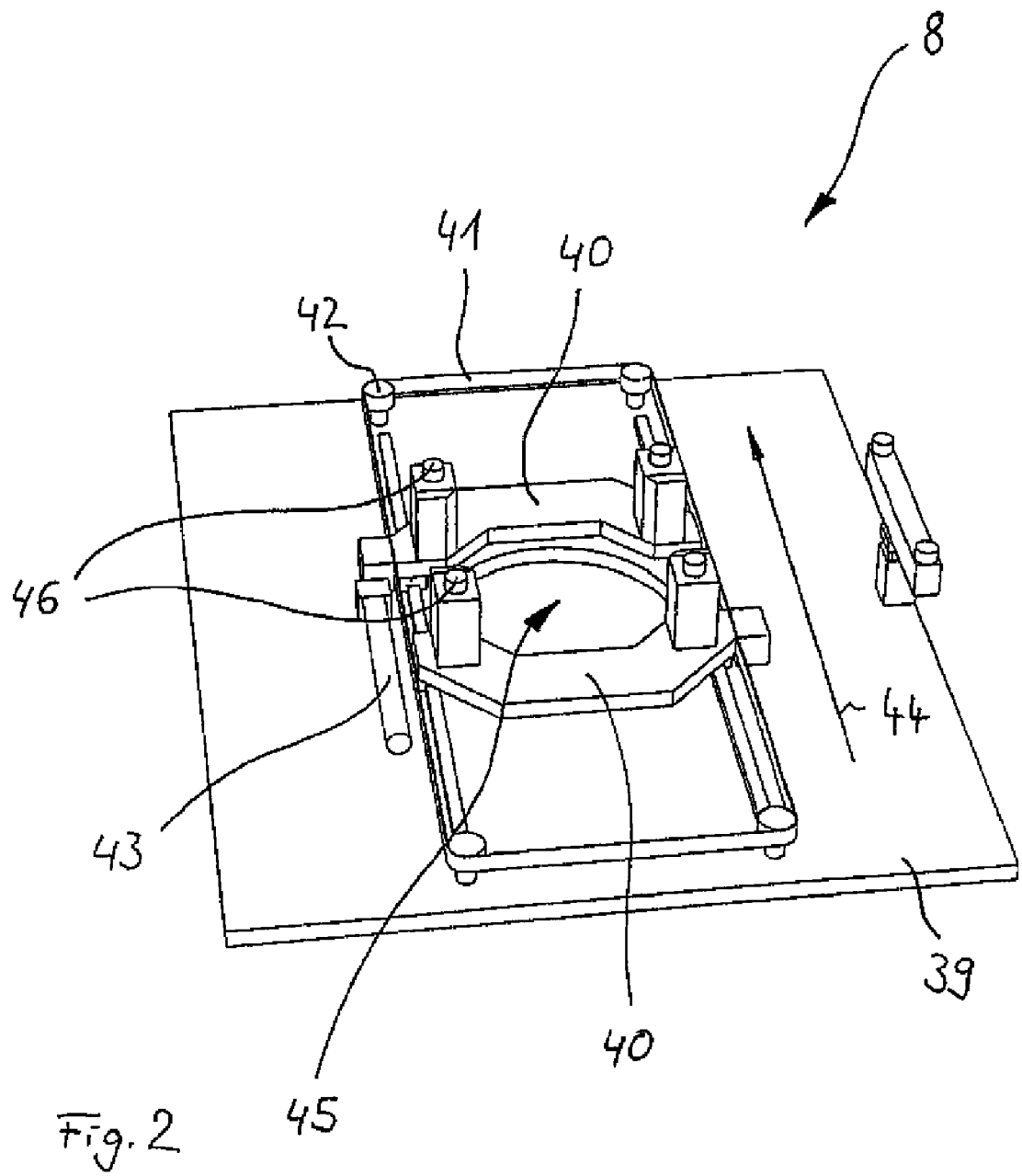

FIG. 2 A perspective view of a centering device provided on the measuring system according to FIG. 1.

Figure 3:
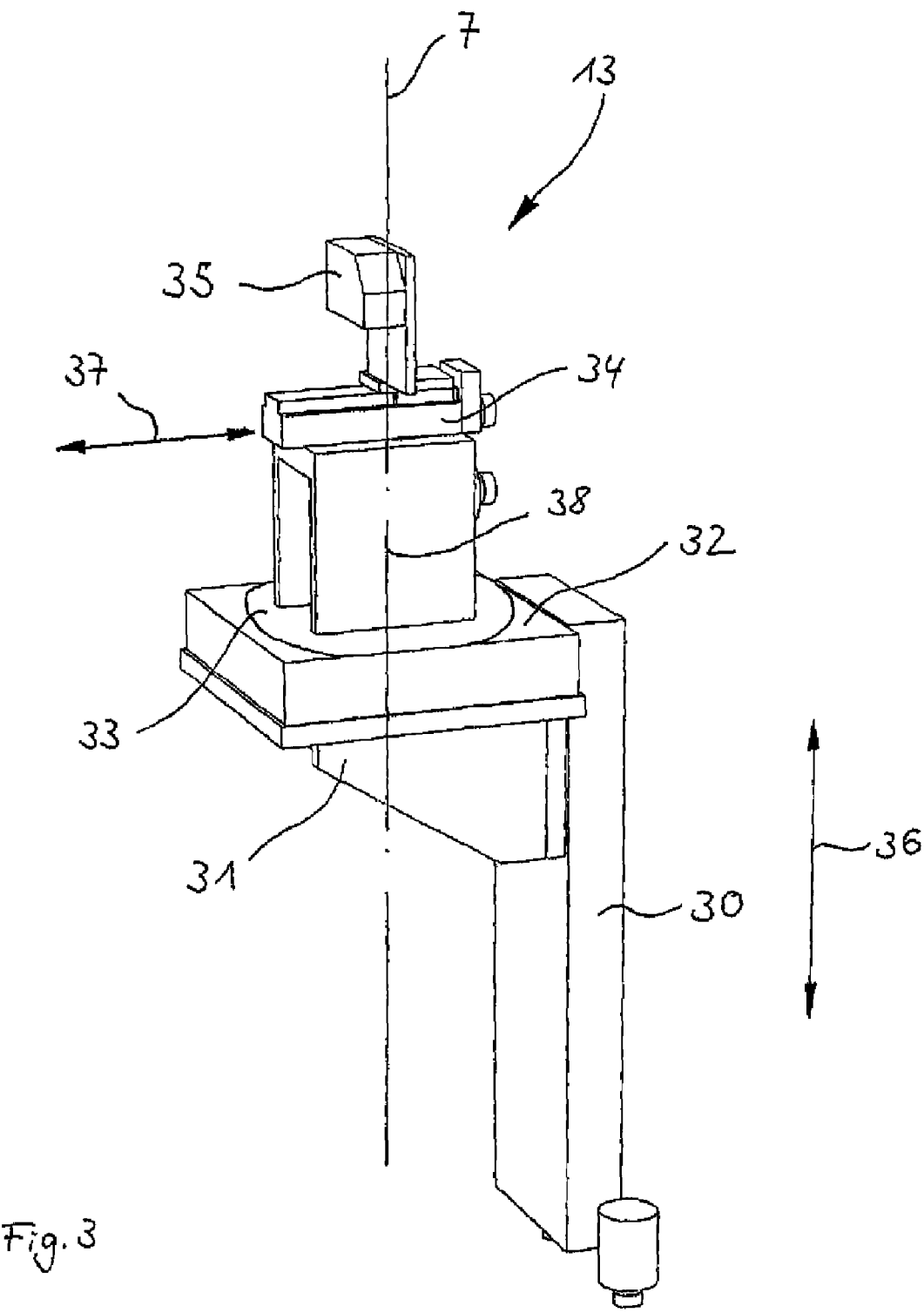

FIG. 3 A perspective view of a reference measuring device provided on the measuring system of FIG. 1.

Figure 4:
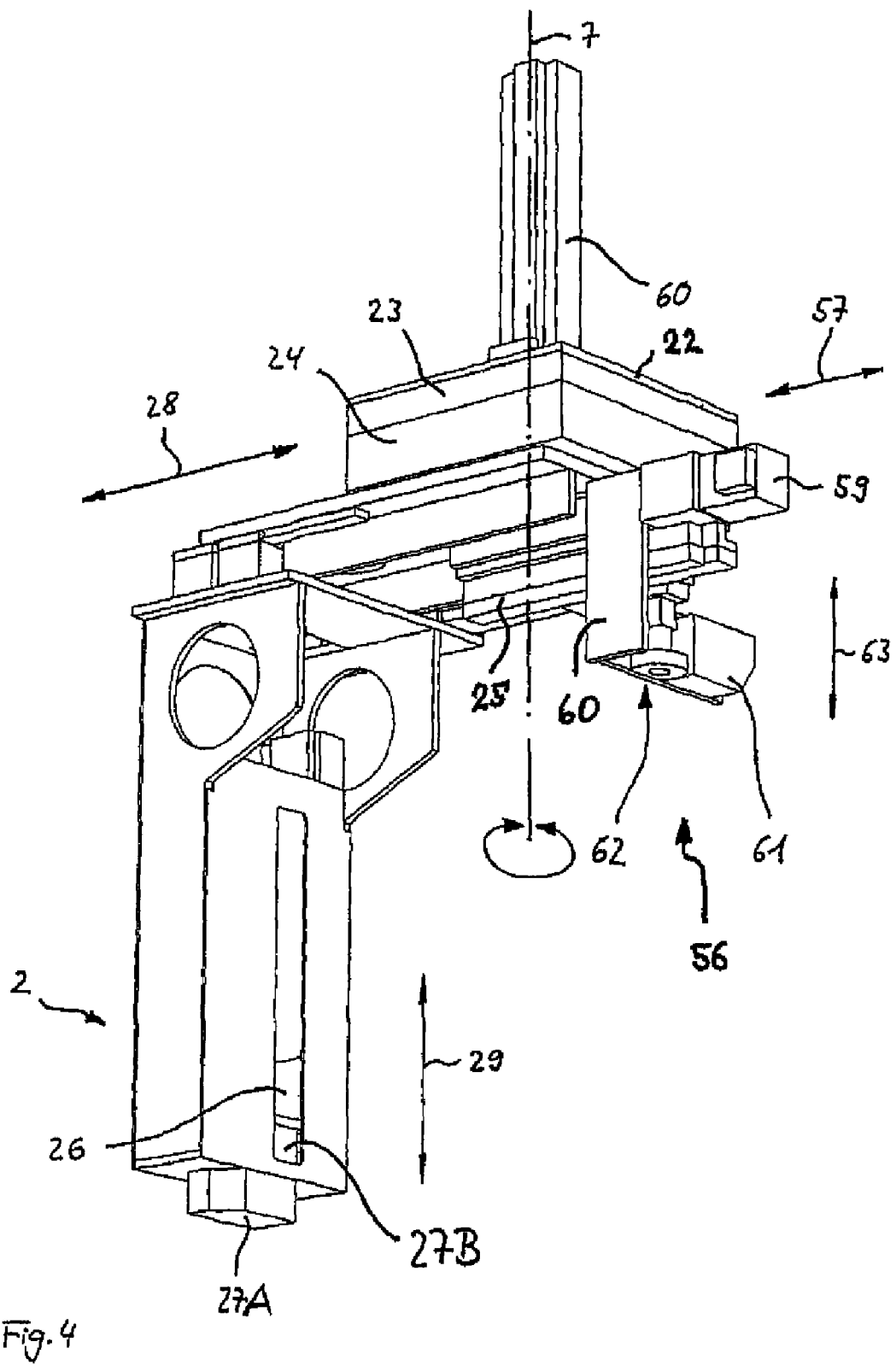

FIG. 4 A perspective view of a sensor system provided in the measuring system of FIG. 1.

Figure 5:
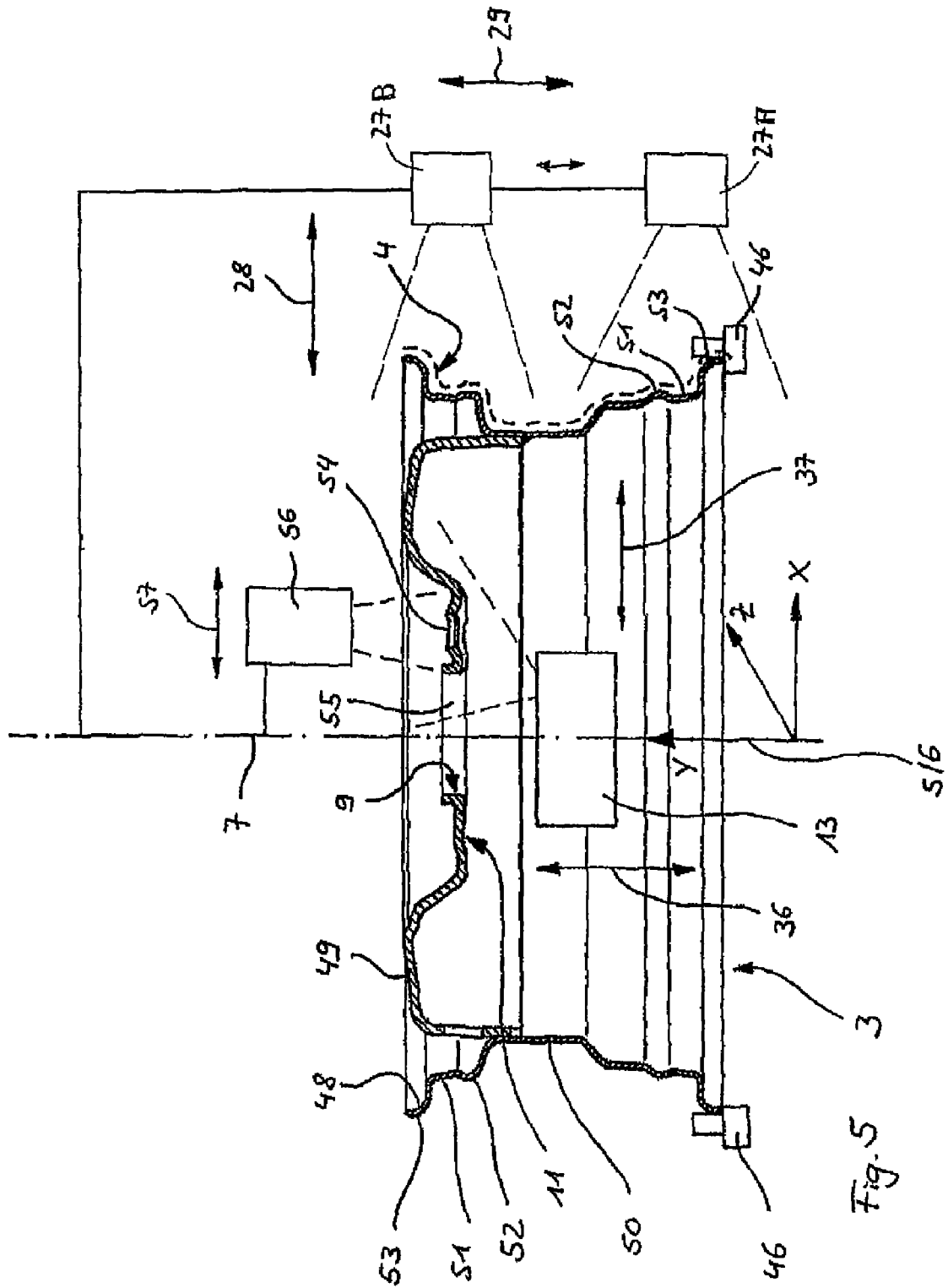

FIG. 5 A planar representation in the form of a sectional view through a vehicle wheel with a diagrammatic representation of the measuring system.

The invention is described in greater detail hereinafter in exemplified manner with the aid of an embodiment of a measuring system in the form of a wheel measuring machine 1. Measuring system 1 is particularly intended for the measurement of measurement objects in the form of vehicle wheels 47 preferably manufactured as worked sheet steel parts or cast or forged parts from aluminium alloys, in a production environment. A complete measurement can take place of all contours to be scanned or sensed for ensuring a predetermined quality level. A cycle time necessary for performing the measurement can be predetermined, independently of the sizes of the individual wheels, in such a way that there is no impediment to a material flow of the vehicle wheels during production.

Measuring system 1 shown in FIG. 1 has a sensor system 2 fitted to a frame 17 with bolt hole sensor 56, a centering device 8, a reference device 13 and a conveying device 14. Frame 17 is manufactured from metal sections 18 arranged at right angles to one another and welded together to form a strong, torsionally stiff frame structure. Frame 17 has a standing surface on a not shown base area of approximately 1030 mm×1030 mm, whilst a height extension of frame 17 is approximately 2000 mm. Roughly at half the height of frame 17 is fitted a conveying device 14, which essentially comprises two horizontal, parallel guide rails 19 connected to frame 17 and conveying rollers 20 mounted in rotary manner between guide rails 19. The conveying rollers 20 are generally motor-driven. On the top of frame 17 are provided two metal sections in the form of crossbars 21, to whose underside is fitted a holding plate 22 for fastening sensor system 2 (FIG. 4).

As shown in FIG. 4, sensor system 2 is constructed in rotary manner with respect to a multiaxially adjustable fastening plate 23, which is fitted to holding plate 22. The rotary mounting of sensor system 2 relative to fastening plate 23 is brought about by a motor-driven turntable 24, a rotation axis of the latter running substantially vertically when mounting the measuring system 1 on a planar base. A linear slide 25 movable orthogonally to rotation axis 7 is fitted to turntable 24 and to the moving part of linear slide 25 is fixed a laser optic profile sensor 27A directed inwards towards rotation axis 7 and a second linear slide 26 movable parallel to the rotation axis is provided. To the second linear slide 26 is fixed a laser optic profile sensor 27B directed inwards with respect to rotation axis 7 and which serves to scan an outer contour of the measurement object. Profile sensor 27B can be moved in three axes by fitting to the second linear slide. A first axis is rotation axis 7, a second axis is formed by the first linear slide 25 and is a horizontal displacement axis 28, a third axis is formed by the second linear slide 26 and is a vertical displacement axis 29 oriented parallel to rotation axis 7. Sensor 27A performs a single rotation about rotation axis 7 and is positioned along displacement axis 28 with linear slide 25.

FIG. 4 shows in greater detail the bolt hole sensor 56, which has a laser optic triangulation sensor. It is fitted by means of a fastening angle to the turntable 24 provided for rotating sensor system 2 about rotation axis 7 and has a linear adjuster 59 for movement in radial direction 57 in a plane orthogonal to the rotation axis and a height adjuster 60 for moving in a vertical direction 63 parallel to rotation axis 7. Thus, the bolt hole sensor 56 can be set to different hole circle diameters of the bolt holes 54 arranged concentrically around central hole 55 and can be used for determining a contour of bolt holes 54.

In measuring system 1, coaxial to sensor system 2, is provided the reference device 13 shown in greater detail in FIG. 3, which is displaceable vertically by means of a lifting unit 30 parallel to rotation axis 7, said lifting unit 30 being fixed by two metal sections to frame 17. According to FIG. 3 lifting unit 13 has a supporting angle movable by the lifting unit and to which fixed a turntable 32 with an integrated, multiaxial fine adjustment receptacle. A linear control element 34 linearly movable orthogonal to rotation axis 7 is provided on table plate 33 rotatable relative to supporting angle 31 and to it is fixed an optically operating measuring head 35. Thus, measuring head 35 can be adjusted in three axes relative to frame 17, namely a linear lift axis 36 parallel to rotation axis 7, a linear radial axis 37 oriented orthogonally to rotation axis 7 and a rotation axis 38 oriented in parallel, particularly coaxially to the sensor system rotation axis 7.

On measuring system 1 is also provided a centering device 8 constructed for centering the measurement object displaceable on conveying rollers 20 relative to sensor system 2 and reference device 13. Centering device 8 shown in greater detail in FIG. 2 has two facing centering slides displaceably connected to a base plate 39 and which are kinematically coupled by means of a toothed belt 41. For this purpose base plate 39 carries belt wheels 42 for deflecting the toothed belt, which is laterally fitted to each centering slide 40. One of the centering slides 40 can be linearly displaced by a pneumatic cylinder 43, there being a displacement direction 44 which is orthogonal to rotation axis 7. As a result of the kinematic coupling of centering slides 40 by means of toothed belt 41, the facing centering slide 40 performs an opposing movement along the displacement direction. Thus, in simple manner, it is possible to centre the measurement object by displacing centering slides 40. Base plate 39 has a central recess 45 through which, as shown in FIG. 1, the reference device 13 can be displaced vertically upwards in order to e.g. record an inner contour and/or a reference structure of the not shown measurement object.

The measurement object 47 diagrammatically shown in FIG. 5 is a vehicle wheel built up from a rim 48 and a wheel dish 49. For the evaluation of the manufacturing quality of such a vehicle wheel 47 consideration must in particular be paid to the radially outwardly directed contour 4 or surface contour of rim 48, whose individual adjacent geometry areas will be briefly described hereinafter.

In a minimum diameter area rim 48 has a rim bed 50, to which is connected in an in each case axial direction a rim hump 52, which forms a transition to a rim shoulder or flange 51 in which, after drawing on a tyre, a contact surface with the tyre is provided and which is terminated to the outside by a rim horn 53. On the inside of the rim bed 50 within the rim there is a wheel dish 49, which is provided with a central hole 55 made in axial direction 9 and bolt holes 54 concentrically distributed around the central hole. On fitting the vehicle wheel 47 central hole forms a positive connection with a portion of a not shown wheel receptacle in the form of a centering mandrel and consequently defines the rotation axis of vehicle wheel 47. Central hole 55 serves as a reference structure for defining the object-fixed object coordinate system 6, whose y-axis is defined by the central axis of the central hole. The central hole is surrounded by an annular portion of wheel dish 49, whose side facing the rim interior forms an interrupted measurement object surface portion 11 which, after fitting the wheel, is firmly braced on the outside of the wheel receptacle. This annular portion defines the x-y reference plane of the measurement object. The reference structure is used for determining the position of the bolt holes 54 and for determining the contour of rim 48, which can be determined by means of the inventive measurement system.

The measuring means used for determining the contour are diagrammatically shown in FIG. 5. It is possible to see sensor system 2 with optical sensors 27A/27B for determining the outwardly directed surface contour of rim 48. For this purpose it is fitted to the diagrammatically represented frame and adjustable along the horizontal displacement axis 28 in the radial direction to rotation axis 7 and along the vertical displacement plane 29 and is rotatable about rotation axis 7 with respect to vehicle wheel 47. The axial spacing of sensors 27A/27B is adjustable. For scanning the surface contour sensors 27A/27B of sensor system 2 are in the form of laser optic triangulation systems, so that they can perform a noncontacting surface scanning.

The reference device 13 introduceable into an inner area of rim 48 for the noncontacting scanning of reference structure 9 and measurement object surface portion 11 is for this purpose displaceable along linear lift axis 36 and linear radial axis 37 and is also rotatable about rotation axis 7 relative to rim 48. The reference device is also implemented by measuring head 35 as a laser optic triangulation system, so that a completely noncontacting scanning of the contour of vehicle wheel 47 is ensured. Measuring head 35 simultaneously covers central hole 55, the position of bolt holes 54 and the annular bearing surface in wheel dish 49.

On the measuring system is also provided an optical bolt hole sensor 56 displaceable in radial direction 57 in order to permit an adaptation to different bolt hole circles. Bolt hole sensor 56 is adjustable axially to different wheel widths.

During the measuring process the vehicle wheel 47 is centred by fixing clamps 46 and rests above the not shown conveying device in order to be able to assume a clearly defined position relative to the measuring system. In the measuring situation shown in FIG. 5 the measurement coordinate system 5 substantially coincides with the object coordinate system 6 and minor variations can be determined by reference device 13 through the scanning of reference structure 9 and can be correlated with the scanning values for the outer surface of rim 48 produced by sensor system 2.

For a measurement of a rotation-like measurement object which can be conveyed on conveying device 14 in a substantially linear movement along the guide rail 19 into measurement system 1, initially sensor system 2 and reference device 13 are each brought into a starting position. The starting position of sensor system 2 is defined by a maximum radial spacing of profile sensors 27A/27B relative to turntable 24, whilst the starting position of reference device 13 is determined by a maximum distance of measuring head 35 from turntable 24 of sensor system 2.

The centering slides 40 of centering device 8 are at a maximum distance from one another in the starting position and by approaching one another allow a centering of the measurement object. This centering takes place as soon as the measurement object has been conveyed by conveying device 14 from the entrance side towards the front in FIG. 1 into the interior of measuring system 1 in a coverage area of centering device 8. The centering slides 40 are moved towards one another with the aid of pneumatic cylinder 43 and toothed belt 41 and with their fixing clamps 46 engage on the outer contour of the measurement object. In the case of symmetrical measurement objects, as a result of the symmetrical arrangement of the fixing clamps 46 on the centering slide there is an orientation of an axis of symmetry of the measurement object substantially concentric to rotation axis 7 of sensor system 2. However, there is no need for a precise centering with respect to the measurement coordinate system.

As soon as the centering device has brought the measurement object into the coverage area of the measurement system and oriented the same sensor system 2 and reference device 13 can be moved from their starting position into a functioning position. In the functioning position profile sensors 27A/27B and measuring head 35 are so spaced relative to the measurement object that they can perform a noncontacting, optical contour recording of the measurement object without there being a risk of the measurement object passing out of their coverage range or mechanically colliding with the measurement object. By means of a not shown size determination means which can be located upstream of the measurement position, data can be made available for the presetting of sensor system 2 and reference device 13.

Profile sensors 27A and 27B provided on sensor system 2 are rotated about rotation axis 7 for recording the contours of the measurement object during the measurement process. Profile sensors 27A and 27B successively scan or sense the contour in scanning planes, which in each case pass radially through rotation axis 7. In a similar manner measuring head 35 records reference structure 9 on rotation about rotation axis 38. An angularly precise association of the associated scanning planes of profile sensor 27 and measuring head 35 is made possible by not shown angle sensors in each case coupled to said measuring devices and which are so matched to one another that identical angles are associated with identical angular positions relative to the measurement object. This permits a clear association of scanning planes of profile sensors 27A and 27B with scanning planes of measuring head 35. A synchronous movement of the two measuring systems is possible, but not necessary. As soon as the sensor system 2 has performed a complete rotation about rotation axis 7, a not shown evaluating device can perform or complete a contour determination of the measurement object on the basis of the determined contour data of sensor system 2, bolt hole sensor 56 and reference device 13. The result of the contour determination produces a data-based representation of the measurement object contour in the measurement coordinate system, which can be transformed into the object coordinate system by means of the determined object coordinate system position.

By comparison with presettable reference contours contained in the evaluating device an actual-desired variation can be established. If the actual contour of the measurement object is in a tolerance range of a reference contour, a maximum or minimum variation from the reference contour can be established, which can be important for a subsequent use of the measurement object. To define said maximum or minimum variation, a not shown marking device can be provided on sensor system 2 and/or reference device 13, which by following the measurement object contour up to the maximum or minimum variation point with respect to the position can carry out a corresponding marking, particularly by ink application, applying an external label or punch marking of the measurement object. The sensor system and reference device 13 are then again moved into their starting positions, the centering device 8 releases the fixing of the measurement object by means of centering slide 40 and the measurement object can be removed in a substantially linear movement from the measurement system 1 by drivable conveying rollers 20.

In this novel concept of a wheel measuring machine instead of the wheel being rotated, the measurement sensor system is rotated about the fixed wheel, which offers numerous important advantages compared with conventional wheel measuring systems.

During the measurement the wheel is stationary in the measurement device and is kept in the measurement position e.g. by the described 4-roll centering device, typically in engagement with the inner horn. As there is no measurement object rotation during measurement, the influence of the wheel weight and dimensions does not enter the dynamic behaviour of the measuring device or process.

No high precision demands are made on the centering device and the latter can have a relatively simple construction so that the centering process can be performed rapidly. Thus, the wheel only has to be positioned in the capture or coverage range of the sensors and during the measurement the wheel is fixed in order to eliminate the influence of vibrations and acoustic excitations in the production surroundings on the measuring process. The clamping forces of the centering device can be kept very small and are typically set in such a way that there is no deformation of the inner horn influencing the measurement.

The dynamic behaviour of the sensor system and therefore the measuring process is largely constant and substantially independent of the wheel dimensions. As the wheel dimensions do not influence the measurement, the measurement cycle time is largely independent of wheel dimensions and weights. The sensors require no free travel movement. During loading and unloading they are merely moved into a position which is outside the interference contour of the conveying movement.

The hub or central hole serving as the reference structure remains freely accessible throughout the measurement. The reference is not formed by mechanical bearing surfaces, but instead the sensors are directly measured on the bearing surface and in the hub hole or bore. This makes it possible to easily compensate an imprecise or inclined fixing.

Any type of sensor system (tactile or noncontacting, e.g. optical, inductive, capacitive) can be used both for the sensor system and for the reference device. The reference structure can be measured by a fixed multiposition measuring head or, as in the embodiment, by a rotary measuring unit.

The flatness of the hub bearing surface 11, which is an important criterion for the security of the fixing to the hub and for the lateral eccentricity quality, can be directly measured with the aid of the sensor system of the reference device. No separate measuring device is required, so that these important data can be established quasi as "waste product" of the reference measurement. By attaching further sensors to the sensor system 2 and/or reference device 13 it is possible to determine further contour features such as the wall thickness on the inner horn or in the wellbase by calculation with respect to the data of sensors 27A/27B or a brake calliper float by corresponding positioning of sensor 35. A connection geometry for a dust cap can also be established with the bolt hole sensor 56. As the reference is measured, no part is played by any contamination at the fixing of the wheel to the inner horn.

The entire range of practically occurring wheel sizes, e.g. diameter 13 to 24.5", opening width 3.5 to 17", hub bore diameter 52 to 281 mm and/or weight approx. 5 to approx. 70 kg is accessible exclusively through the setting of the sensors with positioning units solely through modifying the position parameters thereof. Mechanical adaptations or restructuring are unnecessary. The measurement system is the same for all wheel types. It is obviously also possible to measure dimensions outside the exemplified ranges given.

The concept of the measurement system permits an integration into already existing mechanical conveying, in that e.g. a conveyor belt or the like is usable for conveying the measuring object into the measurement position and following measurement for conveying it out of the measuring position. For the integration of the compact measuring device only a section of the conveying length of approximately one meter is required. The footprint of the measuring device is very small, so that even in almost completely utilized production areas the integration of process-near engineering technology is possible. Obviously the loading and unloading of the measuring device can also take place with pick and place systems or robot systems, which can engage on the wheels, e.g. in the wellbase or flat over the outer horn. Through the integration of match point marking on the sensor system there is no need for separate match point marking manipulators. Already existing setting or calibration masters can continue to be used. These exemplified characteristics show that within the scope of the invention concepts are possible offering maximum flexibility and function scope with respect to the measurement function and integration into the production environment.

The invention claimed is:

1. A method for measuring a vehicle wheel with the aid of a measuring system comprising at least one sensor system for recording a contour of the vehicle wheel in a measurement coordinate system, the method comprising the following steps:

positioning the vehicle wheel in a measurement position in the coverage range of the senor system, wherein the vehicle wheel is substantially rotationally symmetrical with respect to a measurement object axis, the vehicle wheel axis extending through a bore in a central hub of the vehicle wheel;

establishing the position of the vehicle wheel and determining an object coordinate system by means of the central hub of the vehicle wheel which functions as a reference structure positioned at or near the measurement object axis;

linking the object coordinate system with the measurement coordinate system;

rotating the sensor system around the vehicle wheel for determining contour data selected from the group consisting of surface contour data and wall thickness data of the vehicle wheel; and processing the contour data in an evaluation unit and compensating for an imprecise location of the vehicle wheel in the measurement position by taking account of the position of the object coordinate system in relation to the measurement coordinate system.

2. The method according to claim 1, wherein during the measurement, the vehicle wheel is so fixed by a centering device that accessibility to the reference structure is not impeded.

3. The method according to claim 2, wherein the centering device acts on the outer contour of the vehicle wheel.

4. The method according to claim 2, wherein a reference device for establishing the position of the object coordinate system scans the freely acessible reference structure.

5. The method according to claim 4, wherein the reference device scans in noncontacting manner the freely accessible reference structure.

6. The method according to claim 1, wherein a reference device performs a mechanical orientation of the vehicle wheel by means of the reference system for establishing the position of the object coordinate system.

7. The method according to claim 1, wherein a shape and/or position variation of at least one vehicle wheel surface portion provided for engagement on an object surface, oriented orthogonally to a rotation axis of the sensor system and formed on the vehicle wheel is determined by means of the sensor system and/or reference device.

8. The method according to claim 1, wherein a marking is made on the vehicle wheel defining a characteristic measurement point by a marking device connected to the sensor system.

9. The method according to claim 1, wherein the vehicle wheel is conveyed linearly between an insertion opening and a discharge opening of the measurement system.

10. The method according to claim 1, wherein measurement data of the sensor system are linked with measurement data of the reference device for determining wall thicknesses.

11. A device for measuring a vehicle wheel having a central hub defining at least one reference structure for defining an object coordinate system, the device comprising:

at least one sensor system for recording contour data of the vehicle wheel in a measurement coordinate system;

a reference device for establishing the position of the object coordinate system with the aid of the reference structure; and a processor comprising an evaluation unit for processing the contour data and compensating for an imprecise location of the vehicle wheel by taking account of the position of the object coordinate system in relation to the measurement coordinate system, the sensor system being mounted in rotary manner relative to the vehicle wheel in such a way that the sensor system is rotatable around the vehicle wheel.

12. The device according to claim 11, wherein there is a centering device for a positioning and/or fixing of the vehicle wheel in the measurement position before and/or during measurement.

13. The device according to claim 11, wherein the reference device is set up for a noncontacting reference structure scanning.

14. The device according to claim 11, wherein the reference device is constructed for mechanically centering the vehicle wheel with the aid of the reference structure.

15. The device according to claim 11, wherein the sensor system and/or reference device is provided for determining the flatness and/or orientation of a vehicle wheel surface portion provided on the vehicle wheel, oriented substantially orthogonally to a rotation axis of the sensor system and constructed for engagement on an object surface.

16. The device according to claim 11, wherein a marking device for making a marking on the vehicle wheel is provided on the sensor system and/or reference device.

17. The device according to claim 11, wherein the reference device is arranged in rotary manner substantially coaxially to a rotation axis of the sensor system.

18. The device according to claim 11, wherein integration takes place into a conveying device, particularly a linear conveying system.

19. The device according to claim 11, wherein there are size determination means for a basic positioning of the sensor system and/or reference device.

20. The method according to claim 6, wherein the reference structure is measured.

21. The method according to claim 9, wherein the vehicle wheel is conveyed perpendicular to the sensor system rotation axis.

22. The method according to claim 1, wherein the sensor system is rotated about a rotation axis enclosed by a circumference of the vehicle wheel.

23. The method according to claim 1, wherein the measurement comprises a complete rotation of the sensor system about a rotation axis.

24. The method according to claim 1, wherein the vehicle wheel rests during the measurement.

25. The device according to claim 11, wherein the sensor system is rotatable about a rotation axis enclosed by a circumference of the vehicle wheel.

26. The device according to claim 11, wherein the measurement comprises a complete rotation of the sensor system about a rotation axis.

27. The device according to claim 11, wherein the vehicle wheel rests during the measurement.

* * * * *